(12) United States Patent
Handermann et al.

(10) Patent No.: US 7,589,037 B2
(45) Date of Patent: Sep. 15, 2009

(54) SLICKENED OR SILICONIZED FLAME RESISTANT FIBER BLENDS

(75) Inventors: Alan C. Handermann, Asheville, NC (US); Scott A. Bridges, Asheville, NC (US)

(73) Assignee: Basofil Fibers, LLC, Enka, NC (US)

( * ) Notice: Subject to any disclaimer, the term of this patent is extended or adjusted under 35 U.S.C. 154(b) by 50 days.

(21) Appl. No.: 11/331,244

(22) Filed: Jan. 12, 2006

(65) Prior Publication Data

US 2006/0160454 A1 Jul. 20, 2006

Related U.S. Application Data

(60) Provisional application No. 60/643,632, filed on Jan. 13, 2005.

(51) Int. Cl.
*D04H 1/00* (2006.01)
*D04H 1/54* (2006.01)
*D02G 3/04* (2006.01)
*D04H 1/46* (2006.01)

(52) U.S. Cl. ............... 442/414; 57/252; 442/97; 442/98; 442/99; 442/100; 442/102; 442/402; 442/403; 442/405; 442/407; 442/415; 428/920; 428/921

(58) Field of Classification Search ............... 428/920, 428/921; 442/414, 415, 402, 403, 405, 407, 442/389
See application file for complete search history.

(56) References Cited

U.S. PATENT DOCUMENTS

| | | | |
|---|---|---|---|
| 4,088,620 A | 5/1978 | Nihongi et al. | |
| 4,198,494 A | 4/1980 | Burckel | |
| 4,199,642 A * | 4/1980 | Cooper et al. ............... | 442/333 |
| 4,281,042 A | 7/1981 | Pamm | |
| 4,282,283 A | 8/1981 | George et al. | |
| 4,304,814 A * | 12/1981 | Couchoud .................. | 442/146 |
| 4,304,817 A | 12/1981 | Frankosky | |
| 4,526,830 A | 7/1985 | Ferziger et al. | |
| 4,690,859 A | 9/1987 | Porter et al. | |
| 4,726,987 A | 2/1988 | Trask et al. | |
| 4,806,185 A | 2/1989 | Porter et al. | |
| 4,863,797 A | 9/1989 | Ichibori et al. | |
| 4,865,906 A | 9/1989 | Smith, Jr. | |
| 4,923,729 A | 5/1990 | Porter et al. | |
| 4,927,698 A | 5/1990 | Jaco et al. | |
| 4,941,884 A | 7/1990 | Green | |
| 4,950,540 A | 8/1990 | McCullough, Jr. et al. | |
| 4,970,111 A | 11/1990 | Smith, Jr. | |
| 4,987,026 A | 1/1991 | Jacobs et al. | |
| 4,996,289 A | 2/1991 | Berbner et al. | |
| 5,084,488 A | 1/1992 | Weiser et al. | |
| 5,149,582 A | 9/1992 | LaMarca, II et al. | |
| 5,162,487 A | 11/1992 | Weiser et al. | |
| 5,169,582 A | 12/1992 | Illing | |
| 5,208,105 A | 5/1993 | Ichibori et al. | |
| 5,344,707 A | 9/1994 | Snyder | |
| 5,348,796 A | 9/1994 | Ichibori et al. | |
| 5,496,625 A | 3/1996 | Lilani | |
| 5,503,915 A | 4/1996 | Ichibori et al. | |
| 5,503,916 A | 4/1996 | Ichibori et al. | |
| 5,506,042 A | 4/1996 | Ichibori et al. | |
| 5,534,325 A | 7/1996 | Joerder et al. | |
| 5,540,980 A | 7/1996 | Tolbert et al. | |
| 5,560,990 A | 10/1996 | Ilg et al. | |
| 5,585,161 A | 12/1996 | Difloe et al. | |
| 5,645,926 A | 7/1997 | Horrocks et al. | |
| 5,694,981 A | 12/1997 | Stanhope et al. | |
| 5,766,681 A | 6/1998 | Stoddart et al. | |
| 5,824,614 A | 10/1998 | Gadoury | |
| 5,849,648 A | 12/1998 | Kent et al. | |
| 5,853,880 A | 12/1998 | Kent et al. | |
| 5,888,652 A | 3/1999 | Berbner et al. | |
| 5,918,453 A | 7/1999 | Kent et al. | |
| 5,935,882 A | 8/1999 | Fujita et al. | |
| 5,968,855 A | 10/1999 | Perdelwitz, Jr. et al. | |
| 6,102,128 A | 8/2000 | Bridgeman | |
| 6,129,879 A | 10/2000 | Bersted et al. | |
| 6,265,082 B1 | 7/2001 | Dunham et al. | |

(Continued)

FOREIGN PATENT DOCUMENTS

EP 0093965 A2 11/1983

(Continued)

OTHER PUBLICATIONS

"Mixture", Merriam-Webster Online Dictionary, Accessed Nov. 14, 2007.*

(Continued)

*Primary Examiner*—Jennifer A Chriss
(74) *Attorney, Agent, or Firm*—Crowell & Moring LLP

(57) ABSTRACT

The invention relates to slickened or siliconized flame resistant fiber blends that are well suited for use in mattresses, boxsprings, upholstered furniture, fiber-filled bed clothing, transportation seating or any end use application where a soft materials are desired for flame resistant (FR) purposes. Some of the fibers in the blend are slickened. The FR fibers incorporated into these blends include both char forming FR fibers and oxygen depleting FR fibers. FR char-forming fibers are those which exhibit little shrinkage when exposed to direct flame and are not spun from polymers manufactured with halogenated monomers. Oxygen depleting FR fibers are spun from polymers manufactured with halogenated monomers.

27 Claims, No Drawings

U.S. PATENT DOCUMENTS

| | | |
|---|---|---|
| 6,287,686 B1 | 9/2001 | Huang et al. |
| 6,287,690 B1 | 9/2001 | Land |
| 6,297,178 B1 | 10/2001 | Berbner et al. |
| 6,358,608 B1 | 3/2002 | Hanyon et al. |
| 6,397,401 B2 | 6/2002 | Belcher |
| 6,489,256 B1 | 12/2002 | Kent et al. |
| 6,497,787 B1 | 12/2002 | Geel |
| 6,823,548 B2 | 11/2004 | Murphy et al. |
| 6,858,550 B2 | 2/2005 | Ahluwalia |
| 2002/0034906 A1 | 3/2002 | Berbner et al. |
| 2003/0054717 A1 | 3/2003 | Ahluwalia |
| 2003/0171050 A1 | 9/2003 | Eichhorn et al. |
| 2003/0176125 A1 | 9/2003 | Ahluwalia |
| 2004/0062912 A1* | 4/2004 | Mason et al. ............... 428/139 |
| 2004/0198125 A1 | 10/2004 | Mater et al. |

FOREIGN PATENT DOCUMENTS

| | | |
|---|---|---|
| EP | 0221330 A1 | 5/1987 |
| EP | 0355193 A1 | 2/1990 |
| EP | 0622332 A1 | 11/1994 |
| GB | 2104929 A | 3/1983 |
| GB | 2245606 A | 1/1992 |
| JP | 52144470 A | 12/1977 |
| KR | 2002074868 A | 10/2002 |
| WO | WO 01/53578 A1 | 7/2001 |
| WO | WO 03/023108 A1 * | 3/2003 |

OTHER PUBLICATIONS

Horrocks, A.R. and Price, D. Fire Retardant Materials, Woodhead Publishing Limited, 2001, p. 25.*

Turbak, Albin F., Ed.: Nonwovens: Theory, Process, Performance, and Testing, 2nd Ed., 1993, pp. 139-151, Tappi Press, Atlanta, Georgia.

Bureau of Home Furnishings and Thermal Insulation website, date unknown, available as of filing date, 2 pages.

BCC Website, Halogen and Nonhalogen Flame Retardancy, The thirteenth Annual BCC Conference on Flame Retardancy, Jun. 2-5, 2002, 3 pages.

Porter, K.: "Nonwoven Textile Fabrics: Spunbonded Fibers," in: Encyclopedia of Chemical Technology, 3rd Ed., vol. 16, Jul. 1984, pp. 72-104, New York.

Drelich, A.: "Nonwoven Textile Fabrics: Staple Fibers," in: Encyclopadia of Chemical Technology, 3rd Ed., vol. 16, Jul. 1984, pp. 104-124, New York.

Sateri Oy website, 10 pages, date unknown, available as of filing date.

State of Calif. Dept. of Consumer Affairs, Technical Bulletin 129; Flammability Test Procedure for Mattresses for Use in Public Buildings, Oct. 1992, pp. 1-31.

State of Calif. Dept. of Consumer Affairs, Technical Bulletin 133: Flammability Test Procedure for Seating Furniture for Use in Public Occupancies, Jan. 1991, pp. 1-28.

Brochure: VISIL® Technical Information, Sateri Oy, Valkeakoski, Finland, 44 pages, date unknown, available as of filing date.

"A Guide to Fibers for Nonwovens," Nonwovens, Industry, Jun. 1987, pp. 26-45.

Joseph, M.L.: Introductory Textile Science, 5th Ed., 1986, pp. 130-134, Holt, Rinehart and Winston, New York.

Tondl, Rose Marie: "Tencel Lyocell, the New Generic Fiber," University of Nebraska-Lincoln website, 2 pages, date unknown, available as of filing date.

Lyocell Fiber, Fibersource website, 1 page, date unknown, available as of filing date.

Tencel Fiber: The New Age Fiber, Lenzing Fibers website, 2 pages, date unknown, available as of filing date.

* cited by examiner

SLICKENED OR SILICONIZED FLAME RESISTANT FIBER BLENDS

RELATED APPLICATIONS

This application is a non-provisional application claiming the benefit of Provisional Application Ser. No. 60/643,632, filed Jan. 13, 2005, the content of which is hereby incorporated in its entirety.

BACKGROUND OF THE INVENTION

1. Field of the Invention

The invention relates to slickened or siliconized flame resistant fiber blends that are well suited for use in mattresses, boxsprings, upholstered furniture, fiber-filled bed clothing, office panel fabric, transportation seating or any end use application where a soft materials are desired for flame resistant (FR) purposes. Some forms of this invention include:

1) FR thermally bonded or resin bonded highloft comprising fiber blends of FR fibers with non-FR fibers, some fibers of which are slickened.
2) FR needlepunched nonwovens comprising fiber blends of FR fibers with non-FR fibers, some fibers of which are slickened.
3) FR loose fill fiber comprising fiber blends of FR fibers with non-FR fibers, some of which are slickened; and
4) FR woven and FR knit fabrics produced from yarns comprising fiber blends of FR fibers with non-FR fibers, some fibers of which are slickened.

The FR fibers incorporated into these blends include both char forming FR fibers and/or slickened and oxygen depleting FR fibers. Either or both or these types of fibers may be slickened or siliconized. FR char-forming fibers are those which exhibit little shrinkage when exposed to direct flame and are not spun from polymers manufactured with halogenated monomers. Oxygen depleting FR fibers are spun from polymers manufactured with halogenated monomers. Oxygen depleting FR fibers generate decomposition gases, when exposed to flame, which help to prevent autoignition of the decomposition products coming from underlying layers of, for example, polyurethane foam and they also help extinguish residual flame which may emanate from overlying dress cover fabric or the like. Oxygen depleting gases from the fibers spun from polymers manufactured with halogenated monomers, when included in the fiber blend, also coat and protect the carbonaceous char formed during decomposition of the char forming FR fibers. This invention also discloses, surprisingly, that a significant percentage of slickened or siliconized non-FR fibers such as natural, synthetic, or even cellulosic fiber, such as lyocell or rayon, can be added to the fiber blend and still perform well in open flame resistant applications. These synergistic slickened or siliconized fiber blends, which impart soft and comfortable end use properties, are able to withstand extended periods of direct flame exposure with minimal shrinkage. The use of slickened or siliconized flame resistant fiber blends as recognized in this invention, also result in softer and more comfortable open flame resistant composite articles with improved water resistance, while also permitting the continued use therewith of conventional non-FR dress cover fabrics and conventional non-FR polyurethane foams and the like.

The advantages of slickened or siliconized flame resistant fiber blends include:

a) imparting a softer, silkier, slicker, more luxurious hand (feel) to a FR product;
b) better water resistance properties than FR fiber blends that do not contain the slickened/siliconized FR fibers; and
c) when included in mattress and upholstered furniture the slickened/siliconized FR fiber blend makes the final composite article quieter, when compressed and stretched, than a comparable composite article which does not contain the slickened/siliconized FR fibers.

2. Description of the Related Art

It is well known in the textile industry to produce FR products for use in upholstered furniture, mattresses, boxsprings, automotive seating, public transportation seating, aircraft seating and the like, using needlepunched, highloft, spunbond or spunlace nonwoven fabrics or woven or knit fabrics formed of natural or synthetic fibers which are either inherently FR or treated or coated with fire retarding chemicals. Conventional fire retarding chemicals include borate-based, halogen-based, phosphorus-based, melamine-based and/or antimony-based chemicals. Unfortunately, these FR products have not previously imparted the comfort and/or softness features desired by manufacturers of end-use articles which must be made open flame resistant.

Some of the flame barrier fabrics currently being used with the goal to pass open flame resistant tests, such as TB129, TB133, TB603 and TB604; but which do not have the comfort features described in this invention include:

1) Woven polymer coated 100% fiberglass flame barrier (Sandel® Fabric, Sandel International Inc.);
2) Woven or knit core-spun yarn based flame barrier, where natural and/or synthetic fibers are wrapped around a multifilament fiberglass core and then optionally treated with FR chemicals and/or a coating of thermoplastic polyvinyl halide composition, such as polyvinyl chloride (Firegard® Seating Barriers, Intek; Firegard® Brand Products, Chiquola Fabrics, LLC);
3) Nonwoven hydroentangled spunlace flame barrier made of 100% p-aramid or p-aramid fiber blends with other fibers (Thermablock™ Kevlar® Z-11, DuPont Company);
4) Woven or knit core-spun yarn based flame barrier where natural and/or synthetic fibers are wrapped around a multifilament glass or a spun p-aramid core yarn and then optionally treated with fire retarding chemicals and/or a coating of thermoplastic polyvinyl halide composition, such as polyvinyl chloride (Firegard® Seating Barriers, Intek; Firegard® Brand Products, Chiquola Fabrics, LLC, Alessandra FR barrier cloth, McKinnon-Land, LLC); and
5) Nonslickened highloft and needlepunched FR barriers made from blends of either inherently FR or fire retarding chemically treated fiber blends (Protech™, Carpenter Co; Esyntial Safe™, Western Nonwoven Inc.; VitaSafe™, Vita Nonwovens, fire retarding chemical treated cotton battings, Jones Fiber Co.).

It is well known in the industry to manufacture slickened and/or siliconized polyester fiber blends (U.S. Pat. Nos. 4,304,817 & 4,281,042) for improved softness, comfort and silky feel; unfortunately, these products usually have much worse flame resistance properties than their non-slickened counterparts. Slickened polyester has also been blended with some minor amounts (up to 20%) non-slickened flame retardant fibers (U.S. Pat. No. 4,199,642). This blend will not pass the aforementioned tests for a flame barrier. It is the object of the present invention to describe flame resistant fiber blends that provide the desired softness, comfort and feel, while still providing the required level of flame protection.

SUMMARY OF THE INVENTION

To overcome or conspicuously ameliorate the disadvantages of the related art, the present invention to utilizes slickened or siliconized FR fiber blends capable of passing open flame tests, while imparting desirable soft, comfortable properties to the composite article. The slickened or siliconized FR fiber blends containing a substantial portion of FR fibers are incorporated into composite articles such that when tested according to test methods such as: California Test Bulletin 129 (TB129), California Test Bulletin 133 (TB133), California Test Bulletin 603 (TB603), California Test Bulletin 604 (TB604), the proposed Consumer Product Safety Commission (CPSC) Flammability Test for mattresses and boxsprings, bedclothing and upholstered furniture, British Standard 5852 crib 5 (BS5852), the British Standard 7176 and the British Standard 7177, the British Standard 7176 and the British Standard 7177, etc.; the slickened or siliconized FR fiber blends allow the composite articles to continue to be used with conventional materials such as dress cover fabrics and polyurethane foams, while still passing these open flammability tests. It is understood by someone skilled in the art that slickened or siliconized FR fiber blends described in this invention, even at overall lower basis weights, can be made to pass less stringent open flame tests than those mentioned above.

The term "slickened" or "siliconized: as used herein, means that the fibers have been treated with some type of lubricant, often silicone, to enhance the softness, hand, and the drape of the textile product into which the fibers are incorporated. Hereinafter the term "slickened" will also include siliconized.

One of the product forms for the slickened and/or siliconized FR fiber blends of the invention is thermally bonded highloft. "Highloft" is in reference to (i) lofty, relatively low density nonwoven fiber structure, preferably having a greater volume of air than fiber; (ii) nonwoven materials that are produced with the purpose of building loft or thickness without increasing weight; and/or (iii) nonwoven fiber products that are not densified or purposely compressed over a significant portion of the product in the manufacturing process.

In accordance with the highloft form of the present invention a highloft density level of 5 Kg/m$^3$ to 50 Kg/m$^3$ or, more preferably 6 kg/m$^3$ to 21 Kg/m$^3$, and even more preferably, 7.5 kg/m$^3$ to 15 Kg/m$^3$ is well suited for the flame barrier purposes of the present invention.

The denier values of the slickened and/or siliconized FR fiber blends of the present invention preferably are in the range of 0.8 to 200 dtex, with ranges of 0.9 to 50 dtex and 1 to 28 dtex being well suited for many applications of the present invention.

Another form of the invention is a composite article such as a mattress and/or an upholstered furniture product manufactured with the product forms made with the slickened FR fiber blends that can pass various open flammability tests.

Upon direct exposure to flame and high heat, the slickened FR fiber blends of this invention form a thick, flexible char with essentially no shrinkage in the x-y plane. This char forming behavior prevents cracking of the flame barrier, protecting the underlying layers of, for example, foam materials in the composite article from being exposed to direct flame and high heat. The thick, flexible char may also help to block the flow of oxygen and volatile decomposition gases, while slowing the transfer of heat by creating an effective thermal insulation barrier. The char forming behavior of the slickened or siliconized FR fiber blends considerably lengthens the time it takes the underlying materials for example polyurethane, to decompose and ignite and also be designed to help existing "surface" flame to self-extinguish.

Other forms of the invention include slickened fiber blends for the manufacture of resin bonded FR highloft, needlepunched nonwoven fabrics for use in mattress, boxspring, upholstered furniture, fiber-filled bed clothing and transportation seating applications by making an intimate staple fiber blend from Category 1 and 2 (below) optionally adding fibersfrom either or all of Categories 3, 4 and 5. The optional addition of Category 6 binder resinsis also possible, such as in place of the Category 3 material or supplemental to the Category 3 material. The optional addition of chemically treated fire retardant cellulosic fibers is also possible.

For purposes of this invention, it is important that the fiber blend contain both Category 1 and Category 2 fibers, and that some, but not necessarily all, of the fibers in the blend be slickened. Thus, the blend could contain Category 1 and Category 2 fibers with at least some of the Category 1 or Category 2 fibers slickened. Also, the blend could be of Category 1, 2, and 4 fibers, with some, but not necessarily all of the Category 4 fibers only slickened. It is also possible for all of the fibers in the blend to be slickened. It is also possible for all of the fibers in the blend to be slickened. It should also be understood that at least 20% (and preferably at least 30%) of the fibers in the blend should be slickened. Also, the amount of slickened inherently flame retardant fibers and fibers made with halogenated monomers can be at least 25% by weight.

Category 1:

Inherently flame-resistant, fibers, which may have been slickened or siliconized with low friction spin finish materials such as commercial silicone-oil emulsions, polysiloxanes, polymeric dispersions of polytetrafluorethylene, or other slickening fiber finish materials. Category 1 fibers include; melamines, meta-aramids, para-aramids, polybenzimidazole, polyimides, polyamideimides, partially oxidized polyacrylonitriles, novoloids, poly(p-phenylene benzobisoxazoles), poly(p-phenylene benzothiazoles), polyphenylene sulfides, flame retardant viscose rayons, (e.g., viscose rayon based fiber containing 30% aluminosilicate modified silica, $S_iO_2+Al_2O_3$, polyetheretherketones, polyketones, polyetherimides, and combinations thereof.

The above noted melamine is an example of a Category 1 fiber that is inherently flame-retardant and shows essentially no shrinkage in the X-Y plane upon being subjected to open flame. Melamine fibers, for example, are sold under the tradename BASOFIL (Basofil Fibers LLC) and described in U.S. Pat. No. 5,888,652.

Other Category 1 fibers which can be slickened for use in this invention include: meta-aramids such as poly(m-phenylene isophthalamide), for example, those sold under the tradenames NOMEX by E. I. Du Pont de Nemours and Co., TEIJINCONEX by Teijin Limited, CHINFMNEX@ ARAMID 1313 by Guangdong Charming Chemical Co. Ltd. and FENYLENE by Russian State Complex; para-aramids such as poly(p-phenylene terephthalamide), for example, that sold under the tradename KEVLAR by E. I. Du Pont de Nemours and Co., poly(diphenylether para-aramid), for example, that sold under the tradename TECHNORA by Teijin Limited, and those sold under the tradenames TWARON by Acordis and FENYLENE ST (Russian State Complex); polybenzimidazole such as that sold under the tradename PBI by Hoechst Celanese Acetate LLC, polyimides, for example, those sold under the tradenames P-84 by Inspec Fibers and KAPTON by E. I. Du Pont de Nemours and Co.; polyamideimides, for example, that sold under the tradename KERMEL by Rhone-Poulenc; partially oxidized polyacrylonitriles, for example, those sold under the tradenames FORTAFIL OPF by Fortafil Fibers Inc., AVOX by Textron Inc., PYRON by Zoltek Corp., PANOX by SGL Technik, THORNEL by American Fibers and Fabrics and PYROMEX by Toho Rayon Corp.; novoloids, for example, phenol-formaldehyde novolac, for example, that sold under the tradename KYNOL by Gun Ei Chemical Industry Co.; poly(p-phenylene benzobisoxazole) (PBO), for example, that sold under the tradename ZYLON by Toyobo Co.; poly(p-phenylene benzothiazoles) (PBT); polyphenylene sulfide (PPS), for example, those sold under the tradenames RYTON by American Fibers and Fabrics, TORAY PPS by Toray Industries Inc., FORTRON by Kureha Chemical Industry Co. and PROCON by Toyobo Co.; flame retardant viscose rayons, for example, those sold under the tradenames LENZING FR by Lenzing A.G. and VISIL by Sateri Oy Finland; polyetheretherketones (PEEK), for example, that sold under the tradename ZYEX by Zyex Ltd.; polyketones (PEK), for example, that sold under the tradename ULTRAPEK by BASF; polyetherimides (PEI), for example, that sold under the tradename ULTEM by General Electric Co.

Combinations of the above types of Category 1 fibers may be utilized.

The most preferable Category 1 fibers are those that are either white, off-white, transparent or translucent in color, since any other color can negatively effect the look of the composite article, especially when used in a flame barrier which is placed directly under white or light-colored decorative upholstery and/or mattress ticking fabrics. Thus, when considering that, on an achromatic scale, white paper has a reflectance value of 80% or more and black has about a 10% reflectance value, the preferred white or off white fiber color falls much closer to the 80% reflectance end of the range (e.g., +/−20). In this regard, melamine fibers are particularly well suited for use in the present invention. Melamine fibers also have outstanding insulative properties, exhibiting a thermal resistance of 0.10 Watts/meter-degree Kelvin and they also provide an endothermic cooling effect, absorbing 5 watts of energy per gram of fiber, when thermally decomposing between 370-550 deg Celsius.

One other particular inherently flame resistant fiber is suitable for use as a Category 1 fiber, is a cellulosic fiber such as a viscose rayon based fiber having, for example, a high silica content built into the fiber. A suitable fiber of this nature is a viscose rayon based fiber containing 33% aluminosilicate modified silica ($S_iO_2+Al_2O_3$) made by Sateri Oy in Valkeakoski, Finland. The fiber is commonly referred to and has a tradename of Visil® fiber.

Category 2:

Fibers produced from polymers made with halogenated monomers. These fibers may be slickened with low friction spin finish materials such as commercial silicone-oil emulsions, polysiloxanes, polymeric dispersions of polytetrafluorethylene, or other slickening fiber finish materials. Category 2 fibers generate oxygen depleting gases, when exposed to flame, which help to prevent volatile decomposition vapors of underlying or adjacent materials such as polyurethane to autoignite and also help to prolong the life of the category 1 fiber (mixes or non-mixes) when subjected to open flame and also help existing "surface" flame self-extinguish. These fiber types include:
  a) Chloropolymeric fibers, such as those containing polyvinyl chloride or polyvinylidene homopolymers and copolymers, for example, those sold under the tradenames THERMOVYL L9S, ZCS & ZCB, FIBRAVYL L9F, RETRACTYL L9R, ISOVYL MPS by Rhovyl S.A; PIVIACID, Thueringische; VICLON by Kureha Chemical Industry Co., TEVIRON by Teijin Ltd., ENVILON by Toyo Chemical Co. and VICRON, made in Korea; SARAN by Pittsfield Weaving, KREHALON by Kureha Chemical Industry Co. and OMNI-SARAN by Fibrasomni, S.A. de C.V.; and modacrylics which are vinyl chloride or vinylidene chloride copolymer variants of acrylonitrile fibers, for example, those sold under the tradenames PROTEX by Kaneka and SEF by Solutia; and combinations thereof. The modacrylic fibers can include flame inhibiting chemicals such as antimony oxide. All of these types of fibers can be slickened or non-slickened.
  b) Fluoropolymeric fibers such as polytetrafluoroethylene (PTFE), for example, those sold under the tradenames TEFLON TFE by E. I. Du Pont de Nemours and Co., LENZING PTFE by Lenzing A.G., RASTEX by W.R. Gore and Associates, GORE-TEX by W.R. Gore and Associates, PROFILEN by Lenzing A.G. and TOYOFLON PTFE by Toray Industries Inc., poly(ethylene-chlorotrifluoroethylene) (E-CTFE), for example, those sold under the tradenames HALAR by Albany International Corp. and TOYOFLON E-TFE by Toray Industries Inc., polyvinylidene fluoride (PVDF), for example, those sold under the tradenames KYNAR by Albany International Corp. and FLORLON (Russian State Complex), polyperfluoroalkoxy (PFA), for example, those sold under the tradenames TEFLON PFA by E. I. Du Pont de Nemours and Co. and TOYOFLON PFA by Toray Industries Inc., polyfluorinated ethylene-propylene (FEP), for example, that sold under the tradename TEFLON FEP by E. I. Du Pont de Nemours and Co. Again, these fibers may be slickened or non-slickened; and
  c) Combinations Category 3:

Low-melt binder fibers such as:
  a) Low-melt bicomponent polyesters, such as Celbond® sold by Kosa company;
  b) Low-melt copolyesters such as LMF sold by HUVIS;
  c) Polypropylenes, such as T-151 as sold by Fiber Innovation Technology or by American Fibers and Yarns Co.; and
  d) Combinations of Category 3 binder fibers.

Low melt binder fibers are those fibers that have melting points lower than the melting points or degradation temperatures of the other fibers in the blends. Typical "low-melt" fibers (polyester and polyolefins) used in the industry have melting points of 110 C to 210 C. Regular fill polyester (high crystallinity) melts at approximately 260 C. Most thermal bonding ovens are limited to operating temperatures below 230 C for fire and conveyor degradation issues.

Category 4:

Non-FR natural fibers in the slickened or non-slickened form. These fibers may be slickened with low friction spin finish materials such as commercial silicone-oil emulsions, polysiloxanes, polymeric dispersions of polytetrafluorethylene, or other slickening fiber finish materials. These fibers include:
  a) Cotton, wool, silk, mohair, cashmere, kenaf and sisal; and
  b) Combinations of the above Category 4 fibers.

Category 5:

Non-FR synthetic fibers in the slickened or non-slickened form. These fibers may be slickened with low friction spin finish materials such as commercial silicone-oil emulsions, polysiloxanes, polymeric dispersions of polytetrafluorethylene, or other slickening fiber finish materials. These fibers include:

a) Nylons, polyesters, polyolefins, rayons, lyocells, for example those sold under the tradename TENCEL by Lenzing AG, acrylics, cellulose acetates and polylactides (for example those sold by Fiber Innovations Technology); and
b) Combinations of the above Category 4 fibers may be utilized.

Category 6:

Halogenated binder resins such as those based on vinylchloride and ethylene vinyl chloride.

The slickened or siliconized fiber blend concentration ranges (by weight percent) of the FR highloft or FR needlepunch embodiments of the invention are as follows:

Category 1: Up to 85%, preferably 10-85% more preferably 5-50% and even more preferably 7-30%.
Category 2: 10-85%, more preferably 20-70% and even more preferably 25-50%.
Category 3: 0-60%, more preferably 5-50% and even more preferably 15-40%.
Category 4: 0-60%, more preferably 5-50% and even more preferably 15-40%.
Category 5: 0-60%, more preferably 5-50% and even more preferably 15-40%.
Category 6: If used, 0-60%, more preferably 5-50% and even more preferably 15-40%.

It is understood by someone familiar in the art, that the level of slickening of the final product can be affected by reducing the level of the slickening/siliconization spin finish types on each of the fibers selected for a particular fiber blend from the categories listed above. It also understood that one or more of the types of fibers (selected from a specific category) included in a particular blend can be added without incorporating any slickening finish, while utilizing fibers from the other categories which have been slickened, in order to obtain a final product which has a suitable level of slickening required for a particular end use application. For example, the Category 1 and 4 fibers could be slickened, while the Category 2 fibers are not. While not necessary, it is preferable, however, that at least one of the Category 1 or 2 fibers be slickened.

Although one of the preferred embodiments of the invention is a thermally bonded highloft, it is also possible to utilize the fibers mentioned in Categories 1, 2, 4 and 5 and utilize binder materials from Category 6 to make a suitable resin bonded highloft flame barrier of the invention. The thermal bonded blend (i.e. also with Category 3 binder fibers) may also be coated (e.g., on one or two sides) with a light sprayed Category 6 resin coating to "lock" the surface fibers in place. This prevents the surface fibers from percolating or migrating through the ticking after being subjected to use. Fiber percolation gives an undesirable fuzzy appearance to the upholstery ticking.

The oxygen depleting gases generated by the category 2 fiber are particularly beneficial in combination with the category 1 material for highloft and needlepunch embodiments of the slickened fiber blends of this invention. In addition to helping prevent autoignition of the decomposition products coming from underlying layers, such as polyurethane foam or the like and helping to extinguish any residual flame emanating from overlying material such as dress cover fabric, the oxygen depleting gases from the polymers made with halogenated monomers also coat and protect the carbonaceous char formed during the decomposition of the inherently FR fibers. In this way, there is provided a significantly longer time before the char disintegrates when exposed to air at open flame temperatures. This synergistic blending under the present invention is thus able to withstand extended periods of time with minimal shrinkage of the char barrier; thereby preventing flames from "breaking through" the char barrier and igniting underlying materials.

The non-FR natural and/or synthetic component fibers in the slickened or non-slickened form are added to improve product economics and the final softness and resiliency properties of the highloft or needlepunch versions of the invention in the end use application.

The above percentage ranges for the various categories is in reference to the percentage by weight of a single layer of material (e.g. a flame barrier whose entire thickness is formed of a common fiber blend or in reference to one layer of a multilayer flame barrier with the other layers either also being provided for flame barrier purposes or not provided for flame barrier purposes). Moreover, the above percentages by weight can also be considered as being applicable to the percentage by weight of the sum of various layers of a multilayer flame barrier, in the case of the highloft and needlepunch embodiments of the invention. For example, the highloft and needlepunch embodiments of the present invention are intended to include within its scope a multilayer flame barrier combination having the same or differing percentages of materials from categories 1 and/or 2 (including zero percent in one layer of one of the categories 1 and 2 material with the other layer making up the difference) amongst two or more of its layers. For instance, the multilayer flame barrier can include one layer designed to provide or emphasize the category 1 material and a second layer designed to provide or emphasize the desired percentage of the category 2 material. As can be seen from the few examples directly above, and the additional examples described hereafter, the present invention provides a high degree of versatility in forming a flame barrier, although, as will become more apparent below, certain combinations of materials, particularly the category 1 and 2 materials, can provide highly advantageous flame barrier functioning. Also, from the standpoint of reducing manufacturing complexity and cost, for example, a single layer or non-multilayer flame barrier having common blend makeup throughout its thickness (based on, for example, an inputted fiber mix blend "recipe" based on the above noted potential category combinations into a computer processor controlling the highloft or needlepunch nonwoven product manufacturing process) is preferred for many applications.

The highloft and non-woven needlepunch forms of this invention also allow for the manufacture of open flame resistant composite articles which have a soft, comfortable feel, while also permitting the continued use of conventional non-flame retardant dress cover fabrics, conventional non-flame retardant fiberfill, and conventional non-flame retardant polyurethane foams, etc. Such composite articles include, upholstered furniture, mattresses, boxsprings, pillows, bedspreads, comforters, quilts, mattress pads, automotive seating, public transportation seating, aircraft seating, office panels and wall panels. The highloft and needlepunch forms of the invention can be used without lamination to the dress cover fabric, which is an advantage over certain forms of currently available flame barriers, since the laminating resins tend to stiffen the "hand" of the upholstered fabric. The highloft and needlepunch forms may also be used as a substitute for conventional non-FR highloft batting. The highloft and needlepunch forms can also, advantageously, be laminated, for example by adhesive coating, to a layer of polyurethane foam, as is current practice in the much of the upholstered furniture industry. This reduces the number of stock units that must be handled in the furniture manufacturing process. Thus, the present invention also provides for continued use of conventional non-flame retardant materials in, for example, upholstered furniture and mattress formation, without altering or disrupting the conventional composite article manufacturing process, except perhaps making the process more simple by reducing one or more steps in a preexisting process such as removing a step of applying FR material to the article.

Another form of this invention is in the manufacture of FR loose fiberfill for top-of-the-bed articles such as pillows and featherbeds and upholstered furniture applications such as "blow-in" seat and back cushions and the like. In this embodiment, the slickened fiber blend could involve the same selection criteria as is specified for the highloft and needlepunch applications. The exact fiber selection and blend level percentage for a FR loose fiberfill blend is a function of the flammability requirements of the application (i.e. test method), the desired properties of the blend and the economic price point desired.

Yet another form of this invention is simply in the manufacture of woven and knit fabrics produced from slickened FR yarns for mattresses, foundations, top-of-the-bed articles such as pillows, mattress pads, comforters and featherbeds and upholstered furniture articles and the like. Yarns that are suitable for this embodiment include, open, ring and core-wrap spun types. In this embodiment, the slickened fiber blend could involve the same selection criteria as is specified for the highloft and needlepunch applications. The exact fiber selection and blend level percentage for a FR blend for the spun yarns used in this embodiment is a function of the flammability requirements of the application (i.e. test method), the desired properties of the blend and the economic price point desired.

As a result of the use of FR fibers, composite articles produced, and also some of the preferred flame barriers of the present invention, can advantageously be free of any fire resistant coatings and chemicals.

DETAILED DESCRIPTION OF PREFERRED EMBODIMENTS OF THE INVENTION

The present invention is directed at providing slickened and/or siliconized fiber blends that can be utilized to pass open flammability tests such as: California Test Bulletin 129 (TB129), California Test Bulletin 133 (TB133), California Test Bulletin 603 (TB603), California Test Bulletin 604 (TB604), the CPSC's open flame tests for mattress/box-springs, top-of-the-bed and upholstered furniture applications, British Standard 5852 crib 5 (BS5852), British Standard 7176, British Standard 7177, etc. These slickened fiber blends allow for the continued use of conventional dress cover fabrics, fiber-fills, polyurethane foams and the like, while still passing these large open flame tests. It is understood by someone skilled in the art that flame barriers made of the slickened fiber blends described in this invention, at overall lower basis weights, can be made to pass less stringent small open flame tests.

The slickening agents typically utilized on textile fibers are most commonly applied to the surface of polyester fibers in order to enhance the softness, hand and drape of comforters, mattress pads and pillows, in the which the fibers are used. Most, but not all, of these slickening agents are silicone based finishes applied to the fibers when produced by the fiber manufacturer. These slickening agents reduce fiber-to-fiber friction resulting in improved softness, hand and drape of the finished, filled products. Examples of suitable slickening agents include commercial silicone-oil emulsion, polysiloxanes, polymeric dispersions of polytetrafluorethylene, and other known slickening fiber finish materials. Some commercially available examples of these slickening and siliconizing agents include: Lurol L670 and Lurol PS9020 produced and sold by Goulston Technologies, Inc.

Application of the slickening agents to the fibers may be accomplished in several ways. Application to staple fibers may be accomplished by overspraying a loose mat of staple fiber as it is moved on a belt or table. These oversprayed staple fibers may then be tumbled or pressed between rollers to further distribute the slickening agent onto the fibers. The overspray may be applied in a specially designed device, which directs the slickening agent onto fiber as it falls or is blown through a duct. Fiber produced as a continuous tow may have the slickening agent applied with a kiss roll or some other wet device that saturates the tow. This tow is then cut or broken into staple in subsequent steps. These slickening agents may also be applied with baths in which the fibers are submerged in a solution or emulsion containing the agents. The fiber becomes fully coated before removal and drying. Another method of application may be overspray of a nonwoven batting as it is produced and before it is used in the finished home products. After application, some agents must be cured at elevated temperatures to impart washfastness to the slickening treatment. Whatever the method of application, the goal is to coat as many of the fiber surfaces as evenly as possible with the slickening agent.

The term "highloft" is used in a general sense to indicate lofty, relatively low density nonwoven fiber structures. These materials typically have a greater volume of air than fiber. The term is also used to describe nonwoven materials that are produced with the purpose of building loft or thickness without increasing weight. As used herein, highloft also refers to products that are not densified or purposely compressed in the manufacturing process. Representative examples of basis weights, thickness and other blend and formation characteristics for the highloft material of the present invention are provided further below.

One of the preferred forms of the present invention utilizes the slickened fiber blends in the manufacture of a highloft flame barrier which is particularly well suited for use as component material in the manufacture of furniture, bedding, bed clothing, etc. The slickened fiber blends of the present invention is thus designed to be incorporated in the manufacturing process of many composite articles without disruption of their current processes and thus the present invention provides a non-disruptive manufacturing substitute for the materials currently used by manufacturers or articles such as padding, cushioning, quilting layers, etc.

Composite articles manufactured with the highloft, needlepunch, or loose fill embodiments of the invention have the look, feel and surface characteristics of similar non-FR slickened products made without the subject of this invention, while providing open flame resistance. For example, one of the standard tests for measuring the open flame resistance of a mattress is California TB 603. According to this test, a full-scale twin sized mattress and boxspring is exposed to a set of dual flame burners. The side flame burner is held vertically 1 inch from the center point where the mattress and boxspring meet; while a top flame burner is held horizontally 1 inch from the center of the top panel of the mattress in a perpendicular orientation to the side of the mattress. Bed sets utilizing highloft or needlepunch flame barrier embodiments of the slickened and/or siliconized fiber blends of the present invention quilted directly under the mattress ticking fabric and above a layer of standard non-FR polyurethane foam can be made to pass TB603. Other open flame tests for which composite articles of the present invention, or composite mock-ups representing these articles, are intended to pass when barriers incorporating slickened fiber blends of the present invention include: California Test Bulletin 129, California Test Bulletin 133, California Test Bulletin 604, the proposed Consumer Product Safety Commission (CPSC) Flammability Test for mattresses and boxsprings, bedclothing and upholstered furniture, the composite British Standard 5852-Crib 5, the British Standard 7176 and the British Standard 7177.

Formation of various non-woven forms of the present invention preferably involves chemical, thermal, mechanical or no bonding formation of slickened fiber blends. Mechanical bonding technique relies on entanglement of the fibers to add sufficient strength to resist destruction from normal handling and intended usage. The conventional mechanical bonding techniques used typically are based on hydroentanglement, needlepunching, stitchbonding, or any other technique (or combination of techniques) that uses mechanical means to physically entangle the fibers after carding.

As an additional example, any combination of techniques that retain the desired attributes of the final barrier are possible. Mechanical bonding equipment may be used in conjunction with other non-mechanical bonding techniques to provide various finished good attributes. For example, one side (top or bottom) of the material can be densified or closed using mechanical techniques while the other side remains lofty. This creates various airflow properties and produces hand or surface feel variances. The loft values provided herein can thus be considered to represent the value of the non-mechanically bonded portion or area of the highloft material.

In chemical bonding, a resin or adhesive, typically in latex form, is sprayed on the carded web and then dried and/or cured to bind the fibers together in their current orientation. The substance sprayed acts as a "glue" holding the fibers together and producing bond points at the intersection or the point where two or more fibers are in contact. Saturation bonding is similar except the web is immersed into a bath of resin instead of the spray application of the resin. The immersion method is less preferred given the flammable nature of most chemical binders. FR additives can be added to the resin, but these are costly and increase process costs as well, and as described above, are not needed for preferred arrangements of the present invention. The chemical binder method has environmental issues that also contribute to the saturation method not being the preferred method of binding for many applications.

Thermal bonding utilizes binder fiber. Binder fiber is typically composed of polymer(s) that have a lower melting point than the "fill" fibers or other fibers in the blend. The binder fiber then melts in the presence of heat in a subsequent processing step. The binder, in molten form in the presence of heat, flows to the intersection of fibers and upon cooling re-hardens and forms a bond. These bonds allow the fibers to remain in their current orientation. Binder fiber can be a solid, single polymer fiber with a significant lower melting point than the fill fibers in the blend. The binder can also be a sheath/core fiber whereas the sheath component is a polymer of low melting point with the core being a polymer of relatively higher melting point.

These thermal/adhesive bonding techniques produce finished materials with significantly higher loft or thicknesses for the same basis weight than mechanical bonding means.

Non-wovens manufactured in accordance with the teachings of the present invention can also be produced and incorporated without any bonding. Non-bonded nonwovens are commonly referred to in the art as "soft goods". Even without bonding, the material will remain in a highloft configuration. "Soft goods" are used, for example, in certain composite articles such as furniture and sufficiently retain their assemblage by way of the natural entanglement (i.e., non-mechanical entanglement) brought about in the highloft manufacturing web forming process i.e. carding, garneting, airlay. In some instances thin laminate strips or other transport/handling facilitation means are added to one surface of the body of the soft goods.

The highloft form of the present invention can be manufactured in a variety of ways. One manufacturing process for forming the highloft embodiment of the present invention involves passing the individual slickened and/or siliconized fiber mass from a compressed bale by way of a feed device, such as a feed conveyor or rolls, to an opener designed to break apart the fiber mass, thus initiating fiber opening and separation, passing opened fiber mass to a weigh device, continuous or batch, designed to weigh the opened fiber mass, blending weighed amounts of the desired amount of opened fiber mass in a blender to achieve a homogeneous blend of the desired amounts of the opened fiber material. The manufacturing process further includes passing the opened, weighed and blended fiber mass to a non-woven forming device such as a carding device to form a web of non-woven material. Preferably the process involves cross lapping or layering webs in a cross-lapping device of the like until the desired thickness of predetermined basis weight highloft material is obtained.

Preferably each of the relied upon stages is controlled and coordinated through use of a central processor in communication with the various pieces of "equipment in the overall system." This allows, for example, an operator to input a desired blend recipe having the above noted desired percentage by weight amounts of the desired categories of material to be used and to control the basis weight of the blended fiber and thickness (e.g., amount of cross-lapping webs) of the desired layer of non-woven highloft flame barrier. The opening and blending of the aforementioned fibers is preferably carried out with high quality fiber openers and blenders that are designed for accurately producing a homogeneous blend of the above described fibers. Suitable opening and blending equipment includes a bale opener and fine opener manufactured by Fiber Controls of Gastonia, N.C. and a blended fiber reserve feed chute manufactured by Dilo Group of Bremen, Germany. Opening is preferably carried out through the use of various stages of opening wherein each successive stage represents finer opening and more fiber separation to help in achieving a more homogeneous and accurate resultant blend. Following the various opening stages, all opened fiber components for use in the desired resultant blend are preferably weighed before blending to ensure accurate percentage of blend. This blending step can be achieved without weighing but poor blending can potentially negatively affect the final flame resistance performance of the flame barrier of the present invention by allowing relative low concentrations of key components in an area of the material.

Blending involves mixing the weighed fibers through layering of the weighed components and feeding through a blending roll beater (which can be configured using pins or saw tooth wire) turning at a high rate of speed relative to the speed of the weighed components and transported into a chute feed or reserve feed hopper, such as the "Direct Feed" brand hopper sold by Dilo Group of Bremen, Germany. Further blending can be accomplished by processing the pre-blended components through a reserve blending mixing chamber such as the Type 99 Reserve Chamber sold by Fiber Controls, Inc. of Gastonia, N.C.

The opened and blended fibers are then processed through a high quality nonwoven carding device (e.g., a Type 1866 Highloft Nonwoven Carding device sold by Dilo Group of Bremen, Germany) and the resulting web is crosslapped or layered (e.g., by way of a CL-4000 series crosslapper sold by Autefa, Germany) to form a highloft web. In a typical carding process there is utilized a series of wire wound rolls turning at various speeds (depending on the application and product to be carded) which can be controlled by the control processor. Most carding devices consist of a breaker section with a large main roller with smaller diameter rolls positioned around the arc of the main roller. A second, larger main roller is configured with a doffer roll between the breaker main and itself. A series of smaller rollers are configured around the second main roller. Two doffer rollers positioned over top one another in a vertical arrangement remove the carded web from the carding device. Various configurations of carding devices are available. Speeds of the rolls in a given carding devices are usually adjustable to allow for processing a wide range of fibers and deniers. In the carding device, the fiber is carded or combed by the action of the moving saw-tooth wire against the fiber mat being fed through the machine. This same process is accomplished through garneting and other various web forming machinery such as airlay webs.

The web exiting the carding devices or web former can be used directly or can be crosslapped, vertically or horizontally, to build product loft or thickness and weight. One equipment manufacturer who sells vertically lapped highloft forming equipment is Struto International, Inc. The Struto type of vertically lapped highloft forming equipment has been found to be especially suited to the manufacture of FR barriers of the present invention when bonded to a lightweight polyester scrim backing, which can also serve as a mattress or dress fabric quilting thread, stitch holding backing layer; when utilizing it in the FR composite article manufacturing process.

Crosslapping layers or stacks of the continuous card web allows for the formation of non-woven material to various desired thicknesses and weights. The web, in one embodiment of the invention, incorporating binding fiber, is carried through a forced air, gas-fired continuous oven with temperatures up to 500° F. so that bonding of the web takes place. Bonding temperatures are dependent on the binder components in the blends. The material is then subjected to final processing such as having the material rolled on rolls and slit to width per application. The material can also be cut into panel size pieces depending on specific applications.

The above described preferred "equipment assemblage" is capable of producing a FR highloft fabric with a soft and comfortable hand and with weights of 40 g/m² (with thickness range of 5 mm to 10 mm) through 1800 g/m² and higher (with a thickness or loft range of 150 mm to 250 mm and higher.)

The FR highloft embodiment of the invention, utilizing slickened and/or siliconized fiber blends, preferably has a basis weight of 75 to 600 g/m², more preferably 150 to 450 g/m² and even more preferably, for many intended uses, 300 to 375 g/m². The FR highloft embodiment of the present invention also preferably has a thickness falling within a range of 6 mm to 75 mm with a thickness range of 7 to 51 mm being well suited for many uses of the present invention. As having too low a basis weight for a given thickness at the higher end of the above basis weight ranges could degrade the barrier effect in some instances, it is desirable for some applications to use the lower end basis weight values in conjunction with lower end thickness ranges while the higher end basis weight are generally not subject to the same concerns. Accordingly, a basis weight level of 75 g/m² (with a preferred loft or thickness range of 6 mm to 13 mm, to 450 g/m² (with a preferred loft or thickness range of 25 mm to 51 mm) is representative of some preferred ranges of the present application. Additional preferred combinations, well suited for many intended uses of the present application including flame barriers for bedding related products, include weight/thickness combinations of 300 g/m² (with a preferred thickness or loft range of 20 mm to 35 mm) to 375 g/m² (with a preferred thickness or loft range of 25 mm to 50 mm.)

A FR highloft density level of 5 Kg/m³ to 50 Kg/m³ or, more preferably 6 kg/m³ to 21 Kg/m³, and even more preferably, 7.5 kg/m³ to 15 Kg/m³ is considered well suited for the highloft embodiment of the present invention.

The preferred denier values of the fibers used in the slickened fiber blends of the present invention preferably are in the range of 0.8 to 200 dtex, with ranges of 0.9 to 50 dtex and 1 to 28 dtex being well suited for many applications of the present invention such as in conjunction with mattresses.

The above-described FR highloft embodiment of present invention provides, among other qualities, increased thermal insulative qualities. This thermal insulation effect helps prevent components, such as polyurethane foams, from auto ignition although the flame has not actually breached the barrier to expose the foam. Higher or lower lofts, weights and densities are possible, but the above ranges are well suited for the preferred usage in providing a "seamless" open flame barrier component in an article such as those describe above. Also, too low a basis weight for too high a thickness can lead to areas in the barrier in which a flame may be able to pass through. The stated values above are relative to pre-assembly of a composite article configurations. The post assembly thickness and hence density values can vary depending on assembly techniques, but generally a loss of thickness is realized not to exceed 50% of original height. As an example, 10% to 25% in loss of loft could be realized in a quilted panel for mattress construction. This usually happens as a result of the fiber being quilted and sewn to a tick and being held at a lower loft as a result of the mattress manufacturing process. The thickness and basis weight values for the pre-assembly configuration are established so as to be functional to the level of desired flame barrier functioning upon final assembly in a desired composite article.

The following non-limiting test examples I and II are set forth to demonstrate a cost effective fiber blend formula which incorporates slickened fibers which can be have been converted to a vertically lapped (Struto) highloft nonwoven flame barrier with a soft and comfortable hand and is suitable for mattresses and boxsprings which can be manufactured to pass a the California TB603 large open flame test.

EXAMPLE I

Nonwoven Highloft with Soft Hand

A vertically lapped highloft as produced with slickened fibers of the present invention, on a Struto vertical lapping machine. The fiber blend consisted of the following:

10% slickened melamine fiber (Basofil Fiber HF200)

30% siliconized lyocell (Lenzing's siliconized Tencel M)

35% unslickened modacrylic fiber that incorporates antimony trioxide for improved flammability (Kaneka's Kanecaron Protex-S)

25% lowmelt polyester with 110 deg C. meltpoint (Huvis LMF)

The above fiber blend was double carded and thermally bonded at 285 deg F. to an 80/20 bicomponent polyester/standard polyester scrim that weighed 1.25 ounces per square yard.

The total basis weight of the vertically lapped soft hand nonwoven FR barrier was 363 g/m² (1.19 ounces per square foot) and had an average thickness of 22 mm in an uncompressed state.

The above produced vertically lapped highloft FR barrier was very soft to the touch and water resistant. A 36" long×24" wide sample was burn tested according to the indicative FR barrier burn procedure described below.

Indicative FR Barrier Burn Procedure

A metal fixture is made in two pieces with overall dimensions of 29"×8.5"×9" (l×w×h) and designed with metal springs being placed in the bottom corner pipe connectors of the fixture as follows:

1) The top section of the fixture is placed in the bottom section and compressed and held under tension with short bungee cords while a 36"×24" (l×w) sample of the soft hand vertically lapped highloft flame barrier is wrapped completely around the fixture;
2) Two small metal binder clips are used to attach the back end of the sample to the top/back aluminum rod of the rectangular fixture and then the sample is wrapped completely around leaving a 2" overlap to be secured to the top/back aluminum rod with four additional metal binder clips;
3) Once the sample is secure, the bungee cords are removed, causing a fixed amount of tension to be applied to the sample, similar to that observed on materials in an actual innerspring mattress;
4) The wrapped fixture is placed on two O-ring stands which lift it ~11" above the bottom of a fume hood. These O-ring stands are placed at either end of the fixture to lift it above the bottom of the fume hood;
5) A 208 mm "T-burner", designed according to specifications detailed in ASTM E-1590, is positioned 1" away and parallel to the bottom center rod of the wrapped fixture, simulating the same location as is used in the full scale mattress burn test as specified in California Test Bulletin 129 (also known as ASTM E-1590);
6) The T-Burner is supplied with 12 liters per minute of propane gas, which is delivered through a flowmeter from a "gas grill" propane tank and ignited with a Bunsen burner;
7) A stopwatch is used to measure the time until the flame generated from the T-burner ignition source "burns through" the sample barrier material; and
8) Other information that can be obtained from this indicative test include:
   a) A qualitative assessment of the shrinkage observed in the barrier due to flame; and
   b) The ability of the barrier to self-extinguish once the ignition source is removed.

The "burn through" time measured with the FR barrier produced in this example was greater than 6 minutes and 30 seconds. All flame was immediately self-extinguished as soon as the propane flow was turned off at 10 minutes. Normally a burnthrough time of greater about 1.5 to 2 minutes is indicative of the fact that a FR barrier is suitable for use in California TB603 mattresses and boxspring applications.

EXAMPLE II

Nonwoven Highloft with Soft Hand

A vertically lapped highloft as produced with slickened and siliconized fibers of the present invention, on a Struto vertical lapping machine. The fiber blend consisted of the following:
- 10% slickened melamine fiber (Basofil Fiber HF200)
- 30% siliconized lyocell (Lenzing's siliconized Tencel M)
- 35% slickened polyvinylchloride fiber (Rhovyl ZCS)
- 25% lowmelt polyester with 110 deg C. meltpoint (Huvis LMF)

The above fiber blend was double carded and thermally bonded at 265 deg F. to an 80/20 bicomponent polyester/standard polyester scrim that weighed 1.25 ounces per square yard.

The total basis weight of the vertically lapped highloft FR barrier was 339 g/m² (1.11 ounces per square foot) and had an average thickness of 22 mm in an uncompressed state.

The above produced vertically lapped highloft FR barrier was very soft to the touch and water resistant. A 36" long×24" wide sample was burn tested according to the procedure described in Example I.

The "burn through" time measured with the FR barrier produced in this example was greater than 10 minutes. All flame was immediately self-extinguished as soon as the propane flow was turned off at 10 minutes. Normally a burn-through time of greater about 1.5 to 2 minutes is indicative of the fact that a FR barrier is suitable for use in California TB603 mattresses and boxspring applications.

It is to be realized that, although, the above examples are directed to a highloft product, the concept of the invention is directed to a fiber blend that can also be incorporated in needle punched non-wovens, loose fill fiber products, woven, and knit products.

While the invention and examples have been described in detail with reference to specific embodiments thereof, it will be apparent to one skilled in the art that various changes and modifications can be made, and equivalents employed, without departing from the scope of the present invention for open flame resistant applications other than the ones described here.

What is claimed is:

1. A flame resistant fiber blend for use in the production of a flame barrier, the fiber blend comprising:
   a) 10-85% by weight slickened inherently flame retardant fibers selected from the group consisting of melamines, flame retardant viscose rayons, and combinations thereof;
   b) 10-85% by weight fibers made with halogenated monomers;
   c) 0-60% by weight non-flame resistant synthetic fibers;
   d) 0-60% by weight non-flame resistant natural fibers:
   e) wherein the amount of slickened inherently flame retardant fibers and fibers made with halogenated monomers is at least 25% by weight; and
   f) wherein at least some of the non-flame resistant synthetic fibers or the non-flame resistant natural fibers are slickened.

2. A flame resistant fiber blend of claim 1 wherein the fibers made with halogenated monomers are selected from the group consisting of chloropolymerics, modacrylics and fluoropolymerics, combinations thereof, and slickened versions thereof.

3. A flame resistant fiber blend of claim 2 wherein the modacrylic fibers include flame inhibiting chemicals.

4. A flame resistant fiber blend as recited in claim 1 wherein the halogenated monomer is modacrylic.

5. A flame resistant fiber blend as recited in claim 1 wherein the non-flame retardant synthetic fibers are fibers selected from the group consisting of nylons, polyesters, polyolefins, acrylics, cellulose acetates, polylactides, rayons, lyocells, and combinations thereof and the non-flame retardant natural fibers are fibers selected from the group consisting of cottons, wools, silks, mohairs, cashmeres, and combinations thereof.

6. The flame resistant fiber blend of claim 1 wherein the fiber blend comprises chemically treated fire retardant cellulosic fibers.

7. A flame resistant fiber bland of claim 1 and further including low melt binder fibers, the blend having been converted into a thermally bonded non-woven flame resistant barrier for use in mattresses, upholstered furniture, or transportation seating.

8. A flame resistant fiber blend of claim 1 which has been converted into a needlepunched nonwoven flame resistant barrier for use in mattresses upholstered furniture, or transportation seating.

9. A flame resistant fiber blend of claim 1 which has been converted into a loose fill flame resistant fiber blend for mattresses, upholstered furniture, transportation seating, or fiber filled bed clothing.

10. A flame resistant fiber blend of claim 1 which has been converted in a spun yarn for a woven fabric flame resistant barrier.

11. A flame resistant fiber blend of claim 1 which has been converted into spun yarn for a knit fabric flame resistant barrier for use in mattresses, upholstered furniture, transportation seating, bed clothing, or office panel fabric.

12. The flame resistant fiber blend of claim 1 wherein the ranges by weight are:
 a) 5-50% of the slickened inherently flame retardant fibers;
 b) 20-70% fibers made with halogenated monomers;
 c) 5-50% non-flame retardant synthetic fibers; and
 d) 5-50% non-flame retardant natural fibers.

13. The flame resistant fiber blend of claim 1 wherein the ranges by weight are:
 a) 7-30% of the slickened inherently flame retardant fibers;
 b) 25-50% fibers made with halogenated monomers; and
 c) 15-40% non-flame retardant synthetic fibers; and
 d) 15-40% non-flame retardant natural fibers.

14. The flame resistant fiber blend of claim 1 wherein the slickened inherently flame retardant fibers include viscose rayon fibers containing silica or aluminosilicate modified silica.

15. The flame resistant fiber blend of claim 14 wherein the fiber blend further comprises m-aramid fibers.

16. The flame resistant fiber blend of claim 14 wherein the fiber blend further comprises p-aramid fibers.

17. The flame resistant fiber blend of claim 14 wherein the fiber blend further comprises polyamideimide fibers.

18. The flame resistant fiber blend of claim 14 wherein the fiber blend further comprises polyphenylene sulfide fibers.

19. The flame resistant fiber blend of claim 14 wherein the fiber blend further comprises novoloid fibers.

20. The flame resistant fiber blend of claim 14 wherein the fiber blend further comprises polyimide fibers.

21. The flame resistant fiber blend of claim 14 wherein the fiber blend further comprises polyetherimide fibers.

22. A non-woven flame resistant barrier comprising a flame resistant fiber blend, the fiber blend comprising:
 a) 10-85% by weight slickened inherently flame retardant fibers selected from the group consisting of melamines, flame retardant viscose rayons, and combinations thereof;
 b) 10-85% by weight fibers made with halogenated monomers;
 c) 0-60% by weight non-FR natural fibers;
 d) 0-60% by weight non-FR synthetic fibers;
 e) wherein the fiber blend further includes 0-60% by weight of a binder component selected from the group consisting of low-melt binder fibers, halogenated binder resins, and combinations thereof;
 f) wherein the slickened inherently flame retardant fibers and the fibers made with halogenated monomers make up at least 25% by weight of the blend; and
 g) wherein at least some of the non-FR natural fibers or the non-FR synthetic fibers are slickened.

23. The flame barrier according to claim 22 wherein the ranges by weight are:
 a) 5-50% of the slickened inherently flame retardant fibers;
 b) 20-70% fibers made from halogenated monomers;
 c) 5-50% low-melt non-FR material fibers, if used;
 d) 5-50% non-FR synthetic fibers, if used;
 e) 5-50% low-melt binder fibers, if used; and
 f) 5-50% halogenated binder resins, if used.

24. The flame barrier according to claim 22 wherein the ranges by weight are:
 a) 7-30% of the slickened inherently flame retardant fibers;
 b) 25-50% fibers made from halogenated monomers;
 c) 15-40% low-melt non-FR material fibers, if used;
 d) 15-40% non-FR synthetic fibers, if used;
 e) 15-40% low-melt binder fibers, if used; and
 f) 15-40% halogenated binder resins, if used.

25. The flame resistant fiber blend of claim 3 wherein the flame inhibiting chemicals are selected from the group consisting of antimony oxide, slickened antimony oxide, and combinations thereof.

26. The flame resistant fiber blend of claim 1 wherein the slickened inherently flame retardant fibers are melamines.

27. The flame barrier according to claim 22 wherein the slickened inherently flame retardant fibers are melamines.

* * * * *